United States Patent Office 3,183,240
Patented May 11, 1965

3,183,240
NEW PROCESS FOR THE PREPARATION OF
2-AMINOTHIAZOLE COMPOUNDS
Yasuo Yura, Tokyo, Japan, assignor to Sankyo
Company, Limited, Tokyo, Japan
No Drawing. Filed May 2, 1962, Ser. No. 191,739
Claims priority, application Japan, May 13, 1961,
36/16,407
4 Claims. (Cl. 260—306.8)

This invention relates to a new process for the preparation of 2-aminothiazole compounds. More particularly, it relates to a new process for preparing 2-aminothiazole compounds having the formulae

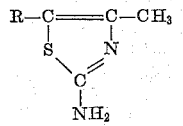
(I)

and

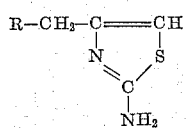
(II)

wherein R is a member selected from the group consisting of straight and branched alkyl groups containing 1 to 8 carbon atoms such as methyl, ethyl, propyl, isopropyl, butyl, isobutyl, pentyl, hexyl, heptyl and octyl.

Heretofore, there are described in literatures a number of processes for preparing 2-aminothiazole compounds having 2-aminothiazole nucleus. While processes for preparing 2-aminothiazole compounds are known, as aforesaid, these processes leave much to be desired. Among these methods, the method in which 2-aminothiazole compounds are prepared from α-haloketone compounds and thiourea according to the method described in Org. Syntheses 19, 10 (1939), by J. R. Byers and J. B. Dickey might be considered to be the most desirable way. However, it is in general difficult to obtain pure α-haloketone compounds used as the starting material for formation of the thiazole nucleus.

It is an object of this invention to provide a new, technically-simple and commercially-feasible process for preparing 2-aminothiazole compounds having the above Formulae I and II. Other objects will become apparent from the following description.

As a result of studies made in order to find an improved process for preparing 2-aminothiazole compounds, I have attained the foregoing and other objects in accordance with the present invention by reacting α-halogenoacetylene compounds having the formula

R—CH—C≡C—H
 |
 X
(III)

wherein R has the same meaning as described above and X is halogen with thiourea to give 2-aminothiazole compounds having the above Formulae I and II. The process according to the present invention is particularly advantageous in the use of the starting material having the Formula III, because it can be obtained in pure state by reacting aldehyde compounds (IV) with acetylene (V) to form α-acetylenealcohol compounds (VI) and reacting the latter compounds with halogenating agent such as phosphorous tri-(bromide), phosphorous tri-chloride or thionyl chloride in accordance with the following equation:

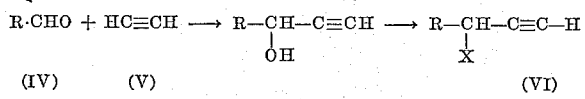

wherein R and X have the same meaning as described above.

The reactions in the process according to the present invention may be chemically represented by the following equation:

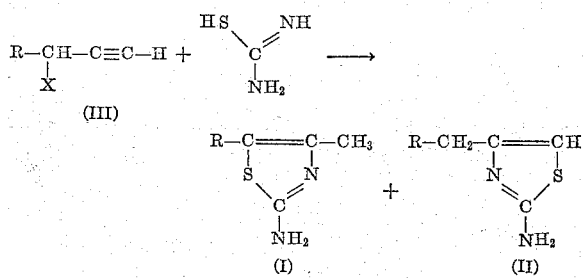

In carrying out the process according to the present invention, the reaction is conveniently effected by heating under reflux the reactants in an inert organic solvent such as methanol, aqueous methanol, ethanol, aqueous ethanol, acetone and the like. The reactants are usually used in the range of ratio of about 1–2 moles of thiourea per mole of α-halogenoacetylene compound. The time required for the reaction is about 1 to 20 hours.

After completion of the reaction, the reaction product, which is a mixture of two sorts of 2-aminothiazole compounds respectively having the above Formulae I and II, may be recovered from the reaction mixture and separated into each 2-aminothiazole compound by one of the conventional methods. For example, after completion of the reaction, the organic solvent is distilled off from the reaction mixture, and the residue is treated with aqueous alkali solution such as aqueous sodium hydroxide, aqueous potassium hydroxide, aqueous sodium carbonate or aqueous potassium carbonate, followed by extraction of the product with organic solvent such as diethyl ether or chloroform. The organic solvent is distilled off from the extract to obtain a mixture of the two 2-aminothiazole compounds having the above Formulae I and II in the form of free base. The mixture is treated with picric acid to form mixture of picrates of the above compounds (I) and (II), followed by isolation of each of the picrates by fractional crystallization. The picrates of 2-aminothiazole compound (I) and (II) thus isolated may be separatively treated with alkali to obtain 2-aminothiazole compounds (I) and (II) in the form of free base respectively.

Representative of the α-halogenoacetylene compounds used as the starting material in the process according to the present invention are as follows:

3-bromo-1-butyne;
3-bromo-1-pentyne;
3-bromo-1-hexyne.

The above-mentioned α-halogenoacetylene compounds are converted by the process according to the present invention to the corresponding compounds as follows:

2-amino-4,5-dimethylthiazole, and
2-amino-4-ethylthiazole;

2-amino-4-methyl-5-ethylthiazole, and
2-amino-4-propylthiazole;

2-amino-4-methyl-5-propylthiazole, and
2-amino-4-butylthiazole.

The following examples describe ways in which invention has been practiced, but are not to be construed as limiting its scope.

*Example 1*

A mixture of 5 g. of 3-bromo-1-butyne, 4.3 g. of thiourea and 15 ml. of 99% ethanol is heated under reflux for 2 hours. The solvent is distilled off from the reaction mixture and the residue is made alkaline with sodium hydroxide and extracted with diethyl ether. The extract is dried over anhydrous potassium carbonate and distilled to remove the diethyl ether. To the residual mixture of 2-amino-4,5-dimethylthiazole and 2-amino-4-ethylthiazole is added a solution of picric acid in ethanol to obtain picrates of the compounds which are fractionally crystallized from ethanol to obtain picrate of 2-amino-4,5-dimethylthiazole (yield, 12.5%; M.P., 248° C. Calc'd for $C_5H_8N_2S \cdot C_6H_3O_7N_3$: C, 38.00; H, 3.08; N, 19.59. Found: C, 38.55; H, 3.14; N, 19.36), and picrate of 2-amino-4-ethylthiazole (yield, 25%; M.P. 214–215° C. Calc'd for $C_5H_8N_2S \cdot C_6H_3O_7N_3$: C, 38.00; H, 3.08; N, 19.59. Found: C, 38.38; H, 3.22; N, 19.55), respectively. Each of the picrates obtained as described above is dissolved in aqueous sodium hydroxide solution, the solution is extracted with diethyl ether and the ether is distilled off from the extract to obtain 0.5 g. of 2-amino-4,5-dimethylthiazole boiling at 90° C. at 2 mm. Hg and 1.2 g. of 2-amino-4-ethylthiazole boiling at 76° C. at 3 mm. Hg respectively.

*Example 2*

A mixture of 6.3 g. of 3-bromo-1-hexyne, 5 g. of thiourea and 10 ml. of 99% ethanol is heated under reflux for 2 hours. The reaction mixture is treated in a manner similar to that described in Example 1 to obtain 2.4 g. of an oily substance boiling at 85–90° C. at 0.06 mm. Hg.

The oily substance is dissolved in 10 ml. of concentrated sulfuric acid under cooling with ice and the solution is poured into ice water, made alkaline with sodium hydroxide and extracted with diethyl ether. The solvent is distilled off from the extract and the residue is added to alcoholic picric acid solution, thereby precipitating a picrate mixture, which is recrystallized from ethylalcohol to give picrate of 2-amino-4-methyl-5-propylthiazole melting at 213–214° C. and having the following analytical results.

Calc'd for $C_{13}H_{15}N_5O_7S$: C, 40.51; H, 3.89; N, 18.18. Found: C, 41.12; H, 3.78; N, 18.23.

From the mother liquor of the recrystallization, there is obtained the picrate of 2-amino-4-butylthiazole melting at 180–182° C. and having the following analytical results.

Calc'd for $C_{13}H_{15}N_5O_7S$: C, 40.51; H, 3.89; N, 18.18. Found: C, 40.30; H, 3.96; N, 17.98.

Each of the picrates obtained as described above is dissolved in aqueous sodium hydroxide solution and the solution is extracted with diethyl ether. The ether extract is dried over anhydrous potassium carbonate and the ether is distilled off from the extract to obtain 0.9 g. of 2-amino-4-methyl-5-propylthiazole boiling at 90° C. at 0.1 mm. Hg and 1.2 g. of 2-amino-4-butylthiazole boiling at 80–90° C. at 0.06 mm. Hg respectively.

I claim:
1. A process for the preparation of compounds having the formulae

$$R-C=C-CH_3$$ (with S, N, C-NH_2 ring)

and $$R-CH_2-C=CH$$ (with N, S, C-NH_2 ring)

wherein R is a member selected from the group consisting of straight and branched alkyl of 1 to 8 carbon atoms which comprises heating under reflux and in an inert organic solvent a compound having the formula $$R-CH-C\equiv C-H$$
$$\phantom{R-CH}|$$
$$\phantom{R-CH-C\equiv C}X$$

wherein R has the same meaning as described above and X is halogen with thiourea.

2. A process for the preparation of a compound selected from the group of compounds having the formulae (1) $R-C=C-CH_3$ (thiazole ring with NH_2)

and (2) $R-CH_2-C=CH$ (thiazole ring with NH_2)

wherein R is a member selected from the group consisting of straight and branched alkyl of 1 to 8 carbon atoms which comprises heating under reflux and in an inert organic solvent a compound having the formula (3) $$R-CH-C\equiv C-H$$
$$\phantom{R-CH}|$$
$$\phantom{R-CH-C\equiv C}X$$

wherein R has the same meaning as described above and X is halogen with thiourea, whereby a mixture of the compounds (1) and (2) is obtained and separating the mixture into its components.

3. A process as claimed in claim 2, wherein the mole ratio between said compound (3) and thiourea is between about 1:1 to 1:2.

4. In a process of preparing a compound selected from the group of compounds having the formulae (1) $R-C=C-CH_3$ (thiazole ring with NH_2)

and (2) $R-CH_2-C=CH$ (thiazole ring with NH_2)

wherein R is a member selected from the group consisting of straight and branched alkyl of 1 to 8 carbon atoms, wherein thiourea is reacted with a halo-compound, the improvement which comprises that the halo-compound is an α-halo-acetylene compound of the formula (3) $$R-CH-C\equiv C-H$$
$$\phantom{R-CH}|$$
$$\phantom{R-CH-C\equiv C}X$$

wherein R has the above meaning.

No references cited.

IRVING MARCUS, *Primary Examiner.*

D. T. McCUTCHEN, *Examiner.*